(12) United States Patent
Swarbrick et al.

(10) Patent No.: US 8,949,474 B1
(45) Date of Patent: Feb. 3, 2015

(54) METHOD FOR INTER-CHIP AND INTRA-CHIP ADDRESSING USING PORT IDENTIFIERS AND ADDRESS MAPPING

(71) Applicant: Marvell International Ltd., Hamilton (BM)

(72) Inventors: Ian Swarbrick, Santa Clara, CA (US); Joseph Jun Cao, Los Gatos, CA (US); Jun Zhu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 260 days.

(21) Appl. No.: 13/678,952

(22) Filed: Nov. 16, 2012

Related U.S. Application Data

(60) Provisional application No. 61/562,322, filed on Nov. 21, 2011.

(51) Int. Cl.
| | |
|---|---|
| *G06F 12/06* | (2006.01) |
| *G06F 12/10* | (2006.01) |
| *G06F 13/14* | (2006.01) |
| *G06F 13/40* | (2006.01) |
| *G06F 12/02* | (2006.01) |
| *H04L 12/741* | (2013.01) |

(52) U.S. Cl.
CPC .......... *G06F 13/404* (2013.01); *G06F 13/4022* (2013.01); *G06F 12/0615* (2013.01); *G06F 12/10* (2013.01); *G06F 12/0292* (2013.01); *H04L 45/745* (2013.01)
USPC .................. 710/3; 710/316; 710/317; 711/2; 709/218

(58) Field of Classification Search
CPC ..... G06F 12/06; G06F 12/0615; G06F 12/10; G06F 12/0292; G06F 13/4009; G06F 13/4013; G06F 13/404; G06F 13/4022
USPC .......... 710/3, 4, 311, 316, 110, 317; 711/1, 2; 709/218
See application file for complete search history.

(56) References Cited

U.S. PATENT DOCUMENTS

| | | | | |
|---|---|---|---|---|
| 5,390,308 | A * | 2/1995 | Ware et al. | 711/5 |
| 7,363,404 | B2 * | 4/2008 | Boyd et al. | 710/104 |
| 7,430,630 | B2 * | 9/2008 | Boyd et al. | 710/316 |
| 7,478,178 | B2 * | 1/2009 | Torudbakken et al. | 710/31 |
| 7,549,003 | B2 * | 6/2009 | Boyd et al. | 710/104 |
| 7,562,176 | B2 * | 7/2009 | Kloeppner et al. | 710/314 |
| 7,627,706 | B2 * | 12/2009 | Kaushik et al. | 710/268 |
| 7,769,938 | B2 * | 8/2010 | Kaushik et al. | 710/268 |
| 7,907,604 | B2 * | 3/2011 | Boyd et al. | 370/359 |
| 8,489,795 | B2 * | 7/2013 | Suganuma | 710/312 |
| 2006/0129741 | A1 * | 6/2006 | Hillier et al. | 711/5 |
| 2006/0242333 | A1 * | 10/2006 | Johnsen et al. | 710/30 |
| 2006/0242352 | A1 * | 10/2006 | Torudbakken et al. | 710/312 |
| 2006/0282603 | A1 * | 12/2006 | Onufryk et al. | 710/312 |

(Continued)

*Primary Examiner* — Ryan Stiglic

(57) ABSTRACT

A system on a chip (SOC) includes a master module, a first swapping module, and a switch module. The master module is configured to generate a transaction request, the transaction request including an address field including an address, the address corresponding to a first slave module associated with the transaction request, and a plurality of interface select bits corresponding to a desired one of a plurality of ports of the first slave module. The first swapping module is configured to swap, in the transaction request, the plurality of interface select bits with selected bits of the address in the address field. The switch module is configured to route the transaction request to the desired one of the plurality of ports based on the address.

18 Claims, 3 Drawing Sheets

(56) References Cited

U.S. PATENT DOCUMENTS

2008/0209099 A1* 8/2008 Kloeppner et al. .......... 710/314
2012/0272037 A1* 10/2012 Bayer et al. .................. 711/202
2013/0151829 A1* 6/2013 Amann et al. ................... 713/2

* cited by examiner

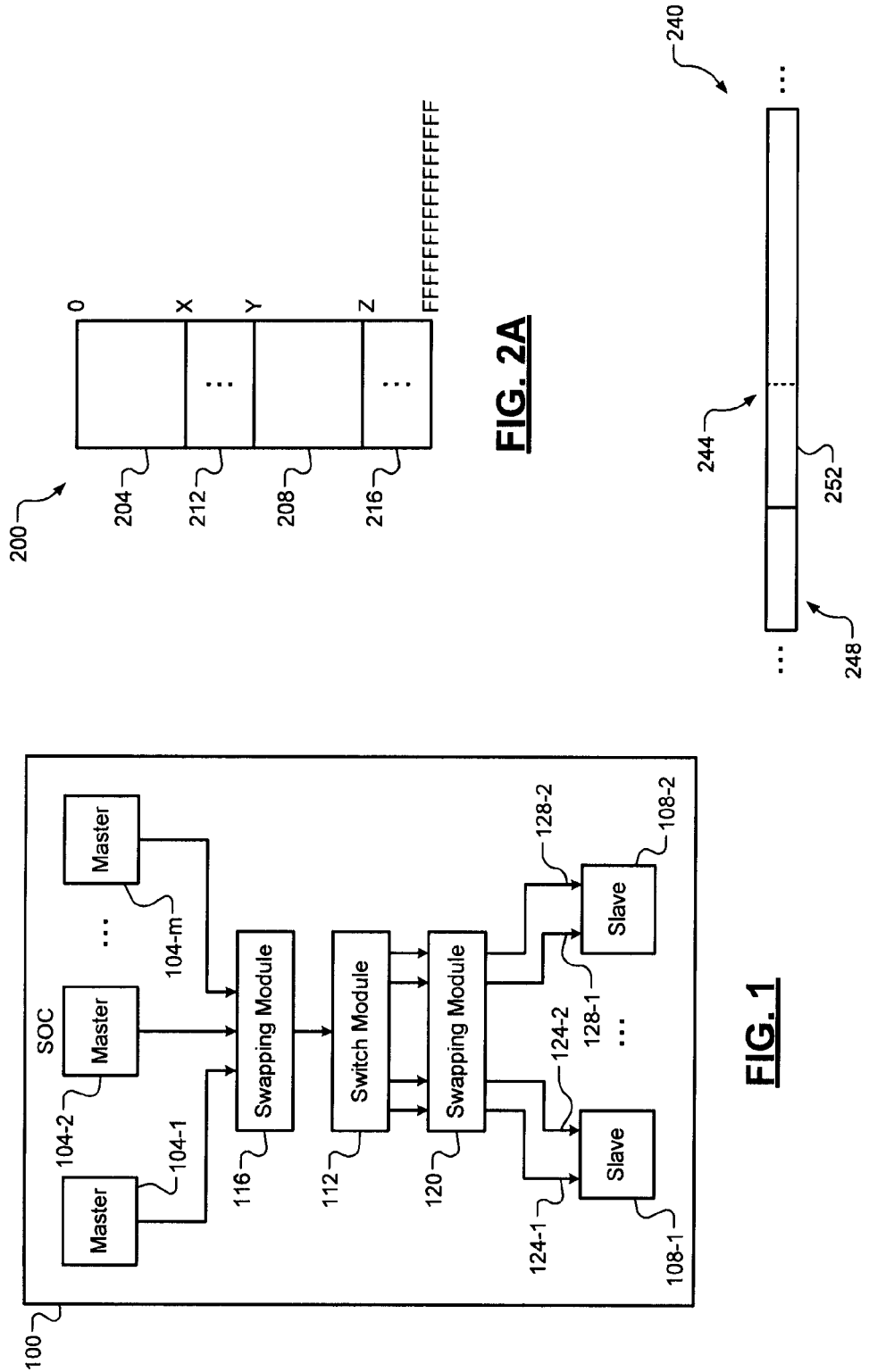

METHOD FOR INTER-CHIP AND INTRA-CHIP ADDRESSING USING PORT IDENTIFIERS AND ADDRESS MAPPING

CROSS-REFERENCE TO RELATED APPLICATIONS

This application claims the benefit of U.S. Provisional Application No. 61/562,322, filed on Nov. 21, 2011. The disclosure of the above application is incorporated herein by reference in its entirety.

FIELD

The present disclosure relates to communication between components of one or more chips, such as a system on a chip (SOC) and/or other integrated circuits (lCs).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a system on a chip (SOC), one or more master components communicate with one or more slave components located on the same SOC or a different SOC. The master components include, but are not limited to, a processor and/or a direct memory access (DMA) controller. The slave components include, but are not limited to, memory such as dynamic random access memory (DRAM) and/or static RAM (SRAM). The master components communicate with the slave components via switching fabric. For example, the master components initiate read and write transactions with the slave components via the switching fabric.

In intra-chip applications (i.e., when a master component communicates with one or more slave components on the same SOC), each slave component corresponds to a different address space. Accordingly, the SOC may implement memory-mapped addressing for intra-chip communication. In other words, transactions with the slave components are routed according to different memory-mapped addresses corresponding to respective ones of the slave components. Conversely, in inter-chip applications (i.e., when a master component communicates with one or more slave components on the same SOC and with one or more slave components on a different SOC), a slave component on one SOC may have the same address space as a slave component on a different SOC.

SUMMARY

A system on a chip (SOC) includes a master module, a first swapping module, and a switch module. The master module is configured to generate a transaction request, the transaction request including an address field including an address, the address corresponding to a first slave module associated with the transaction request, and a plurality of interface select bits corresponding to a desired one of a plurality of ports of the first slave module. The first swapping module is configured to swap, in the transaction request, the plurality of interface select bits with selected bits of the address in the address field. The switch module is configured to route the transaction request to the desired one of the plurality of ports based on the address.

A method of operating a system on a chip (SOC) includes generating, using a master module, a transaction request, the transaction request including an address field including an address, the address corresponding to a first slave module associated with the transaction request, and a plurality of interface select bits corresponding to a desired one of a plurality of ports of the first slave module. The method further includes swapping, in the transaction request, the plurality of interface select bits with selected bits of the address in the address field, and routing the transaction request to the desired one of the plurality of ports based on the address.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 1 is a functional block diagram of an intra-chip addressing system according to the principles of the present disclosure;

FIG. 2A illustrates an address space according to the principles of the present disclosure;

FIG. 2B illustrates a transaction request according to the principles of the present disclosure;

DESCRIPTION

Figure 3:
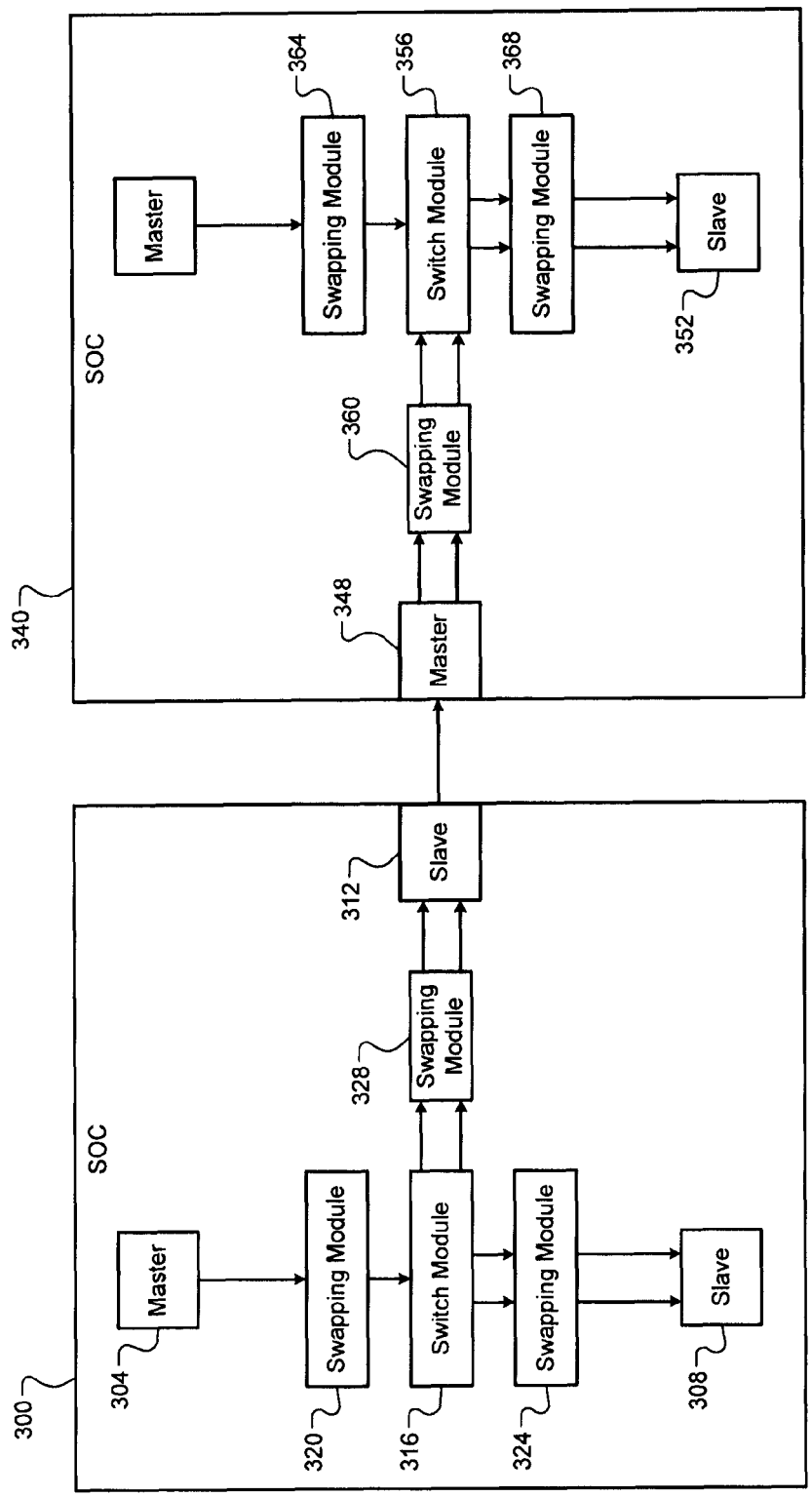
FIG. 3 is a functional block diagram of an inter-chip addressing system according to the principles of the present disclosure.

In a system on a chip (SOC), a master device (and/or associated switch fabric) may be configured to communicate with corresponding slave devices on the same SOC and/or a different SOC using only memory-mapped addressing. In memory-mapped addressing, each read and/or write transaction generated by the master device may be routed according to an address associated with the transaction. For example, the master device generates the transaction including an address corresponding to a specific slave device. The switch fabric routes the transaction to the slave device via one of a plurality of ports. For example, the switch fabric may automatically route transactions from a first master device via a first port, while automatically routing transactions from a second master device via a second port. Accordingly, the master devices do not determine which port is used to communicate with the slave devices.

In addressing systems and methods according to the principles of the present disclosure, transactions are selectively addressed using both memory-mapped addressing and port identifiers. Accordingly, a master device may communicate with a slave device according to a desired port in addition to a memory-mapped address. For example only, the master device (or another component provided between the master device and the switch fabric) may be configured to selectively modify a transaction request to control which port the switch fabric uses to route the transaction. The switch fabric itself may be unmodified and unaware that the transaction request identifies a specific port. The addressing systems and methods according to the principles of the present disclosure are implemented in both intra-chip and inter-chip systems.

Referring now to FIGS. 1, 2A, and 2B, a system on a chip (SOC) 100 includes master modules 104-1, 104-2, . . . , and 104-*m*, referred to collectively as master modules 104, and slave modules 108-1 and 108-2, referred to collectively as slave modules 108. The master modules 104 include, but are not limited to, a processor and/or a direct memory access (DMA) controller. For example only, the master module 104-1 includes a processor and the master module 104-2 includes a DMA controller. The slave modules 108 include, but are not limited to, memory such as direct random access memory (DRAM) and/or static RAM (SRAM). For example only, the slave module 108-1 includes DRAM and the slave module 108-2 includes SRAM. Although m of the master modules 104 are shown, the SOC 100 may include one, two, or any other number of the master modules 104. Similarly, although two of the slave modules 108 are shown, the SOC 100 may include one or any other number of the slave modules 108.

The master modules 104 generate read and write requests (i.e., transaction requests) corresponding to data to be, respectively, read from and written to the slave modules 108. The transaction requests are provided to a corresponding one of the slave modules 108 via switch module 112 and swapping modules 116 and 120. For example, each of the transaction requests includes a memory address corresponding to one of the slave modules 108. The switch module 112 and the swapping modules 116 and 120 route each of the transaction requests to the corresponding one of the slave modules 108 according to the memory address.

Each of the transaction requests is provided to the slave modules 108 via one or more corresponding ports 124-1 and 124-2, referred to collectively as ports 124, and 128-1 and 128-2, referred to collectively as ports 128. For example, transaction requests are provided to the slave module 108-1 via the ports 124 and to the slave module 108-2 via the ports 128. Although each of the slave modules 108 is shown having multiple ports, any of the slave modules 108 may include only a single port.

The slave modules 108 each have a plurality of memory locations corresponding to an address space 200. For example, the address space 200 corresponds to p bit memory addresses. For example only, the address space 200 corresponds to 64 bit addresses ranging from 0 to FFFFFFFFFFFFFFFF. In other implementations, the address space 200 corresponds to 32 or 40 bit addresses.

Each of the transaction requests is routed (i.e., addressed) to a corresponding one of the slave modules 108 according to a memory address (i.e., location) in the address space 200. For example, a first region 204 (e.g., addresses 0 to X) of the address space 200 corresponds to the slave module 108-1 (e.g., DRAM). Conversely, a second region 208 (e.g., addresses Y to Z) of the address space 200 corresponds to the slave module 108-2 (e.g., SRAM). Accordingly, a transaction request addressed to a memory address within the first region 204 is routed to the slave module 108-1. Conversely, a transaction request addressed to a memory address within the second region 208 is routed to the slave module 108-2. A third region 212 (e.g., addresses X+1 to Y−1) and a fourth region 216 (e.g., addresses Z+1 to FFFFFFFF) of the address space 200 may correspond to other devices, or may be unused.

For example, if the transaction request includes a memory address corresponding to the first region 204, then the switch module 112 routes the transaction request to a predetermined port of the slave module 108-1. Conversely, if the transaction request includes a memory address corresponding to the second region 208, then the switch module 112 routes the transaction request to a predetermined port of the slave module 108-2. Accordingly, the switch module 112 routes each of the transaction requests to the slave modules 108 via a selected one of the ports 124 and 128. The switch module 112 may select the one of the ports 124 and 128 automatically, for example only, based on the memory address indicated in the transaction request.

As shown in FIG. 2B, an example transaction request 240 includes a plurality of fields including, but not limited to, an address field 244. The address field 244 includes p (e.g., 32, 40, or 64) bits indicating a memory address within the address space 200. Accordingly, the switching module 112 routes the transaction request 240 based at least in part on the address field 244. For example, the switching module 112 may store data (e.g., a table) correlating the memory address in the address field 244 with a particular one of the ports 124-1, 124-2, 128-1, and/or 128-2.

The transaction request 240 may include a user (or other suitable) field 248. The user field 248 includes, for example only, 2, 4, 8, or another number of bits. In the addressing systems and methods according to the principles of the present disclosure, the master modules 104 store interface select bits in the user field 248. The interface select bits indicate a desired one of the ports 124 and 128 to be used by the switch module 112 to route the transaction request 240. Accordingly, the master modules 104 are configured to select a desired one of the ports 124 and 128 for the transaction request. For example, using the interface select bits, the master modules 104 can select either one of the port 124-1 and the port 124-2 for a transaction request intended for the slave module 108-1. Conversely, the master modules 104 can select either one of the port 128-1 and the port 128-2 for a transaction request intended for the slave module 108-2.

The swapping module 116 receives the transaction request 240, including the address field 244 and the interface select bits stored in the user field 248, from one of the master modules 104. The swapping module 116 swaps the interface select bits (e.g., the 8 bits of the user field 248) with the uppermost bits 252 (e.g., the uppermost 8 bits) of the address field 244. For example, at least the uppermost 8 bits of a 64 bit address are typically unused (i.e., are all 0s). In other words, an address range of the SOC 100 may not exceed 64-8 (i.e., 56) bits. If the interface select bits are 00000000 (i.e., the transaction request 240 does not include an indication of a desired port), then the address stored in the address field 244 is unchanged, and the switch module 112 routes the transaction request 240 to a corresponding port accordingly. In some implementations, the swapping module 116 may simply store the interface select bits into the uppermost bits 252 of the address field 244 without actually swapping the uppermost bits 252 into the user field 248.

Conversely, if the interface select bits are nonzero (i.e., the transaction request 240 includes an indication of a desired port), the transaction request 240 is modified to include a new 64 bit address created in the address field 244. For example only, the new 64 bit address may correspond to unused memory addresses in the fourth range 216 of the address space 200. The switch module 112 routes the transaction request 240 to a selected one of the ports 124 and 128 based on the new 64 bit address. For example, as described above, the switch module 112 may store data (e.g., a table) correlating the memory address in the address field 244 with a particular one of the ports 124-1, 124-2, 128-1, and/or 128-2. When the transaction request 240 is modified to include a different address, the transaction request 240 may be correlated to a different one of the ports 124 and 128.

In other words, the address may correlate to the port 124-1 before the interface select bits are swapped with the uppermost bits 252 of the address field 244, and to the port 124-2 (or, in some implementations, one of the ports 128) after the interface select bits are swapped with the uppermost bits 252. For example only, when the interface select bits are 00000001, then the new address in the address field 244 may correspond to the port 124-1. When the interface select bits are 00000010, then the new address may correspond to the port 124-2. Accordingly, the interface select bits may be used to select between a relatively large number of ports.

In this manner, the master modules 104 are configured to select a desired port for routing the transaction request 240 while still implementing memory-mapped addressing. Further, the switch module 112 continues to implement memory-mapped addressing, and may be configured to only support memory-mapped addressing. In some implementations, the master modules 104 may be configured to update the table stored in the switch module 112 according to desired correlations between memory addresses and corresponding ports.

The swapping module 120 receives the transaction request 240 from the switch module 120 and reswaps the uppermost bits 252 of the address field 244 with the bits of the user field 248. In other words, the swapping module 120 modifies the transaction request 240 to include the original address in the address field 244. Accordingly, when the corresponding slave module 108 receives the transaction request 240, the transaction request 240 is executed according to the original address in the address field 244.

Referring now to FIG. 3, an SOC 300 includes a master module 304, a slave module 308, and a slave module 312. For example only, the master module 304 includes a processor. For example only, the slave module 308 includes DRAM or SRAM and the slave module 312 includes a memory controller. Although only one master module 304 is shown, the SOC 300 may include one, two, or any other number of the master modules 304. Similarly, although two of the slave modules 308 are shown, the SOC 300 may include one or any other number of the slave modules 308 and 312. The master module 304 generates transaction requests that are provided to a corresponding one of the slave modules 308 and 312 via switch module 316 and swapping modules 320, 324, and 328 as described above with respect to FIGS. 1, 2A, and 2B.

Similarly, an SOC 340 includes a master module 344, a master module 348, and a slave module 352. For example only, the master module 344 includes a processor and the master module 348 includes a bus controller (e.g., such as a PCI express controller). For example only, the slave module 352 includes DRAM or SRAM. Although two master modules 344 and 348 are shown, the SOC 340 may include two, three, or any other number of the master modules 344 and 348. Similarly, although one slave module 352 is shown, the SOC 352 may include two or any other number of the slave modules 352. The master modules 344 and 348 generate transaction requests that are provided to the slave module 352 via switch module 356 and swapping modules 360, 364, and 368 as described above with respect to FIGS. 1, 2A, and 2B. In other implementations, the SOC 340 may not include the swapping modules 360, 364, and 368 and may instead merely communicate transaction requests via memory-mapped addressing.

The SOC 300 and the SOC 340 may form a chip-to-chip link (i.e., inter-chip communication). In particular, the SOC 300 may communicate transaction requests to the SOC 340 via the slave module 312 and the master module 340. For example, the SOC 300 may generate transaction requests corresponding to the slave module 308 of the SOC 300, and/or transaction requests corresponding to the slave module 352 of the SOC 340. The transaction requests corresponding to the slave module 352 are routed to the SOC 340 via the slave module 312, the switch module 316, and the swapping modules 320 and 328.

For example, the slave module 308 of the SOC 300 and the slave module 352 of the SOC 340 may share the same address space. In other words, a same range of memory addresses may be correlated to both the slave module 308 and the slave module 352. Accordingly, if the switch module 316 receives an unmodified transaction request generated by the master 304, the switch module 316 may determine that the transaction request corresponds to the slave module 308. Accordingly, the master module 304 also generates interface select bits to indicate a desired port (and therefore a desired one of the slave modules 308 and 312) for the transaction request. The swapping module 320 swaps the interface select bits with the uppermost bits of the address in the transaction request as described in FIGS. 1, 2A, and 2B. The new address corresponds to a region of the shared address space that is correlated to the slave module 312 instead of the slave module 308. Using the address, the switch module 316 correlates the transaction request to either the slave module 308 or the slave module 312, and routes the transaction request accordingly. The swapping module 328 (or the swapping module 324) reswaps the uppermost bits of the address to obtain the original address included in the transaction request.

Accordingly, when the slave module 312 receives the transaction request from the swapping module 328, the transaction request includes the original address, which corresponds to the address space shared by the slave module 352 of the SOC 340. The slave module 312 provides the transaction request to the master module 348. The master module 348 routes the transaction request, using the address (i.e., memory-mapped addressing), to the slave module 352 via the switch module 356. As such, the master module 304 is configured to selectively operate according to memory-mapped addressing (e.g., when communicating with the slave module 308), and is also configured to selectively route transaction requests to a desired port while still operating according to memory-mapped addressing (e.g., when communicating with the slave module 352 located on another SOC 340).

In some implementations, the master modules 104 and 304 and/or the slave modules 108, 308, and 312 are configured to swap and/or reswaps, respectively, the uppermost bits of the address in the transaction requests. Accordingly, one or more of the swapping modules 116, 120, 320, 324, and/or 328 may not be included. In some implementations, the SOC 100 and/or the SOC 300 may be configured to selectively implement the addressing systems and methods according to the present disclosure based on a type of device including the SOC 100 or the SOC 300, and/or based on an intended application.

In other implementations, the master modules 104 and 304 may not be configured to generate the interface select bits. Accordingly, the master modules 104 and 304 and/or another component may implement logic (e.g., glue logic) configured to re-map the address in the transaction request to an address in a different, predetermined region of the address space (e.g., by swapping bits of the address as described above in FIGS. 1, 2A, 2B, and 3). For example only, another component (e.g., a register) of the SOC 100 and/or 300 is configured to generate the interface select bits in response to the modified address. Accordingly, even if the master modules 104 and 304 are not configured to generate the interface select bits, the master modules 104 and 304 are still configured to implement the addressing systems and methods according to the principles of the present disclosure by targeting a particular predetermined address range.

Figure 4:
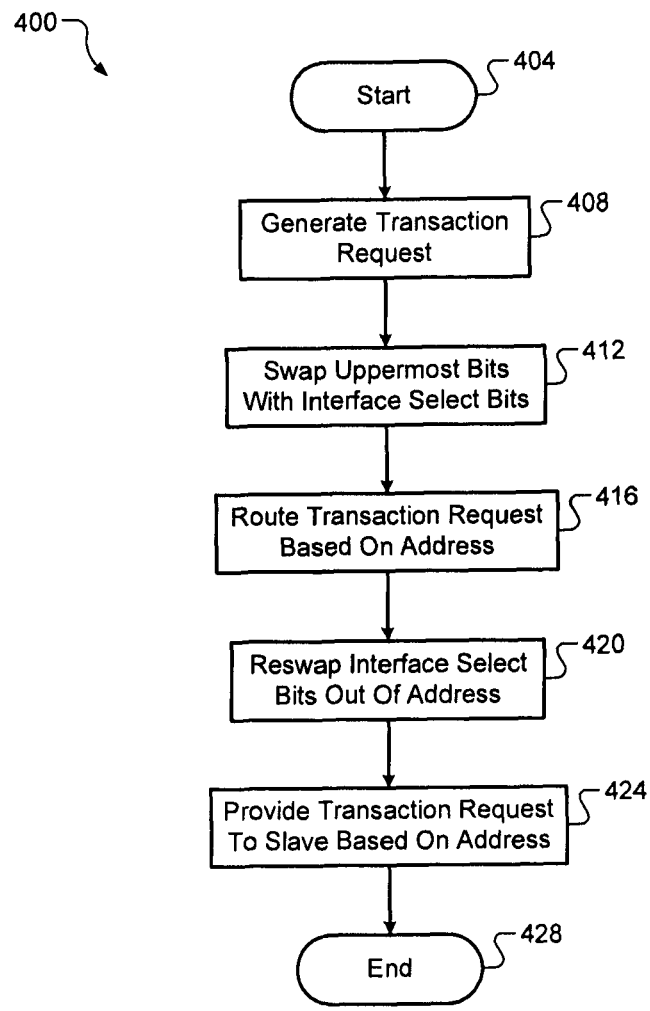
FIG. 4 illustrates an addressing method according to the principles of the present disclosure.

Referring now to FIG. 4, an addressing method 400 begins at 404. At 408, the method 400 generates a transaction request including an address field and one or more interface select bits. The interface select bits correspond to a desired port of a slave module. At 412, the method 400 swaps the interface select bits with uppermost bits of an address stored in the address field. At 416, the method 400 routes the transaction request to the desired port according to the address including the swapped interface select bits. At 420, the method 400 reswaps the interface select bits out of the address field to obtain the original address. At 424, the method 400 provides the transaction request to the slave module corresponding to the address and the desired port. The method 400 ends at 428.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system on a chip (SOC), comprising:
   a master module configured to generate a transaction request, the transaction request including
   an address field including an address, the address corresponding to a first slave module associated with the transaction request, and
   a plurality of interface select bits corresponding to a desired one of a plurality of ports of the first slave module;
   a first swapping module configured to swap, in the transaction request, the plurality of interface select bits with selected bits of the address in the address field; and
   a switch module configured to route the transaction request to the desired one of the plurality of ports based on the address.

2. The SOC of claim 1, wherein the transaction request includes a user field, the user field including the plurality of interface select bits.

3. The SOC of claim 1, wherein the selected bits correspond to uppermost bits of the address.

4. The SOC of claim 1, further comprising a second swapping module configured to i) receive the transaction request from the switch module, and ii) reswap the selected bits of the address with the plurality of interface select bits.

5. The SOC of claim 1, wherein the first slave module is associated with a first region of an address space.

6. The SOC of claim 5, wherein:
   prior to swapping the plurality of interface bits with the selected bits of the address, the address corresponds to the first region of the address space; and
   subsequent to swapping the plurality of interface bits with the selected bits of the address, the address corresponds to a second region of the address space.

7. The SOC of claim 6, wherein the switching module is configured to correlate addresses in the second region of the address space with the desired one of the plurality of ports.

8. The SOC of claim 1, wherein:
   the first slave module is associated with a first region of an address space;
   a second slave module is associated with a second region of the address space;
   prior to swapping the plurality of interface bits with the selected bits of the address, the address corresponds to one of the first region and the second region of the address space; and
   subsequent to swapping the plurality of interface bits with the selected bits of the address, the address corresponds to a third region of the address space.

9. A system comprising the SOC of claim 1 and further comprising a second SOC, wherein:
   the second SOC includes a second slave module;
   the first slave module is associated with a first region of an address space;
   the second slave module is associated with the first region of the address space;
   prior to swapping the plurality of interface bits with the selected bits of the address, the address corresponds to the first region of the address space;
   subsequent to swapping the plurality of interface bits with the selected bits of the address, the address corresponds to a second region of the address space; and
   the switch module is configured to route the transaction request to the second slave module according to the second region of the address space.

10. A method of operating a system on a chip (SOC), the method comprising:
    generating, using a master module, a transaction request, the transaction request including
    an address field including an address, the address corresponding to a first slave module associated with the transaction request, and a plurality of interface select bits corresponding to a desired one of a plurality of ports of the first slave module;

swapping, in the transaction request, the plurality of interface select bits with selected bits of the address in the address field; and routing the transaction request to the desired one of the plurality of ports based on the address.

11. The method of claim 10, wherein the transaction request includes a user field, the user field including the plurality of interface select bits.

12. The method of claim 10, wherein the selected bits correspond to uppermost bits of the address.

13. The method of claim 10, further comprising:
subsequent to the routing, reswapping the selected bits of the address with the plurality of interface select bits.

14. The method of claim 10, wherein the first slave module is associated with a first region of an address space.

15. The method of claim 14, wherein:
prior to swapping the plurality of interface bits with the selected bits of the address, the address corresponds to the first region of the address space; and
subsequent to swapping the plurality of interface bits with the selected bits of the address, the address corresponds to a second region of the address space.

16. The method of claim 15, wherein the routing includes correlating addresses in the second region of the address space with the desired one of the plurality of ports.

17. The method of claim 10, wherein:
the first slave module is associated with a first region of an address space;
a second slave module is associated with a second region of the address space;
prior to swapping the plurality of interface bits with the selected bits of the address, the address corresponds to one of the first region and the second region of the address space; and
subsequent to swapping the plurality of interface bits with the selected bits of the address, the address corresponds to a third region of the address space.

18. The method of claim 10, wherein:
the first slave module is associated with a first region of an address space;
a second slave module located on a second SOC is associated with the first region of the address space;
prior to swapping the plurality of interface bits with the selected bits of the address, the address corresponds to the first region of the address space; and
subsequent to swapping the plurality of interface bits with the selected bits of the address, the address corresponds to a second region of the address space; and
further comprising routing the transaction request to the second slave module according to the second region of the address space.

* * * * *